UNIVERSAL JUNCTOR WITH SPECIAL FEATURES TRUNK

Filed Oct. 18, 1966

UNIVERSAL JUNCTOR WITH SPECIAL FEATURES TRUNK

Filed Oct. 18, 1966 7 Sheets-Sheet 3

UNIVERSAL JUNCTOR WITH SPECIAL FEATURES TRUNK

Filed Oct. 18, 1966 7 Sheets-Sheet 4

Feb. 17, 1970 W. W. PHARIS 3,496,303

UNIVERSAL JUNCTOR WITH SPECIAL FEATURES TRUNK

Filed Oct. 18, 1966 7 Sheets-Sheet 5

Feb. 17, 1970 W. W. PHARIS 3,496,303

UNIVERSAL JUNCTOR WITH SPECIAL FEATURES TRUNK

Filed Oct. 18, 1966 7 Sheets-Sheet 6

United States Patent Office 3,496,303
Patented Feb. 17, 1970

3,496,303
UNIVERSAL JUNCTOR WITH SPECIAL FEATURES TRUNK

William W. Pharis, Rochester, N.Y., assignor to Stromberg-Carlson Corporation, a corporation of Delaware Filed Oct. 18, 1966, Ser. No. 587,491
Int. Cl. H04m 3/56
U.S. Cl. 179—18 42 Claims

ABSTRACT OF THE DISCLOSURE

In a telephone communication system, a universal junctor for connecting originating line circuits to terminating line circuits or outgoing trunk circuits through a line link network and a trunk link network under control of a register processor applied via a service link network and common equipment circuits, the universal junctor including a voice transmission path and control relay means for selectively connecting the originating and terminating line circuits individually via the transmission path to the service link network and for selectively isolating the originating and terminating line circuits from each other and from the service link network in response to control from the register processor. A special conferencing arrangement is provided wherein one of two connected subscribers with the proper class of service can add on a third party by flashing his hook-switch, which causes him to be transferred to a special features trunk, whereupon he may dial the desired special feature and effect connection of the third party. The second party is automatically placed on hold when the special features trunk is connected.

Figure 1:
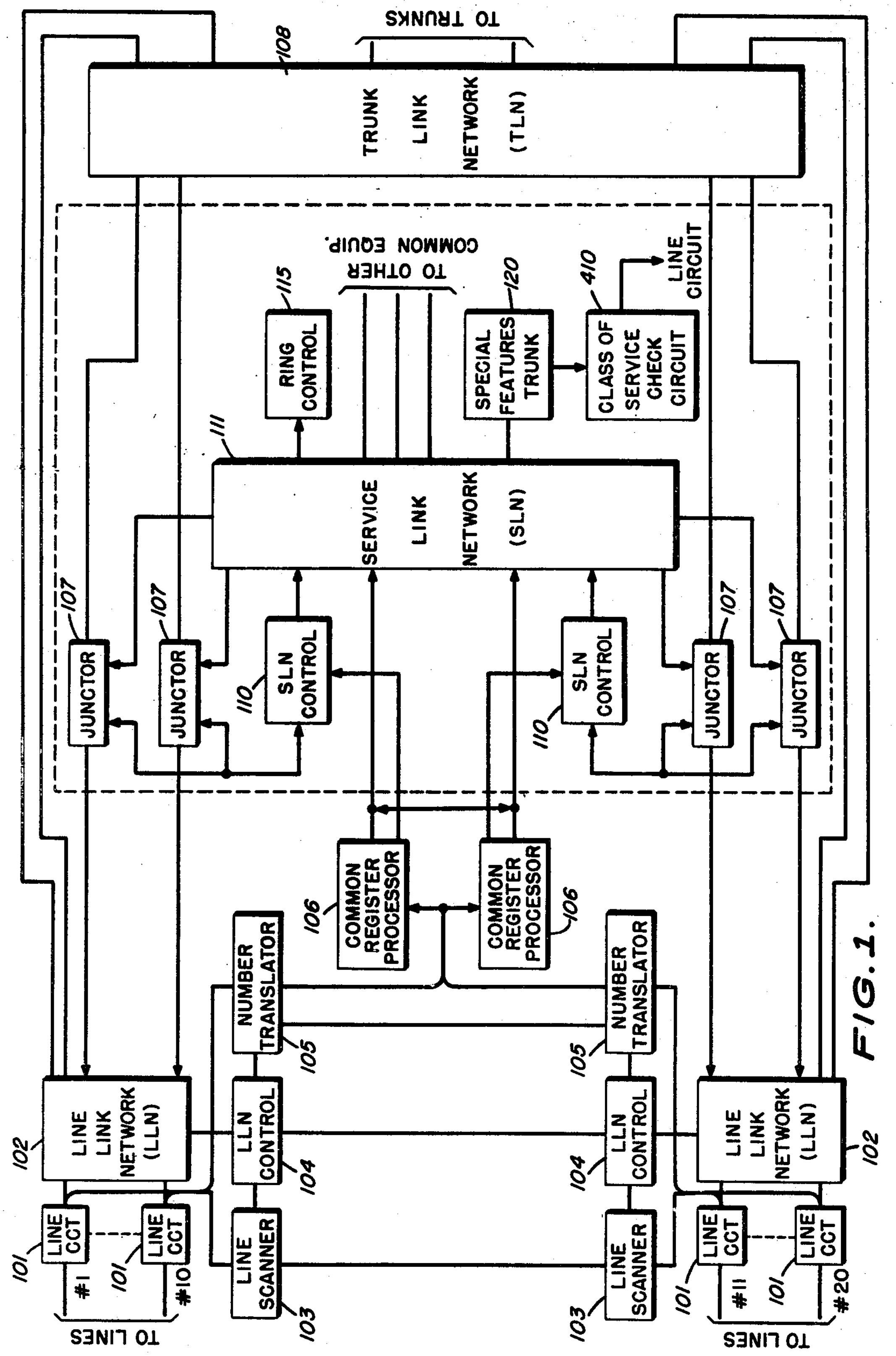

The present invention relates in general to communication systems, and more particularly to improvements in electronic common control telephone switching systems.

As is well known, while present efforts have been directed toward providing fully electronic telephone systems, it is a necessity to associate the newly developed electronic systems with existing line plant, station equipment and trunk equipment of an electromechanical nature. As a result, it has been a common practice to provide isolation devices in the form of originating and terminating junctors to provide an interface between the wires of the line circuits and trunk circuits and the electronic common control equipment. With such an interface, it is possible to properly isolate the electronic time division multiplex modulating and demodulating equipment from the wire connections to the subscriber station equipment.

In copending application S.N. 552,283 filed May 23, 1966 in the name of James G. Pearce et al., and assigned to the same assignee to which the present application is assigned, a universal junctor circuit was disclosed in the form of a single circuit associated with a programmed memory for replacing both of the previously required originating and terminating junctor circuits. The universal junctor circuit disclosed in the aforesaid application includes both calling and called line sensors and a plurality of control relays operated under control of a register sender system via a supervisory processing circuit in connection with the programmed memory associated with the junctor circuit to detect both calling and called line conditions and effect the necessary interconnection of common control equipment to the various calling and called line circuits to establish an interconnection therebetween and provide the necessary subsequent special features service available to the subscribers. The memory associated with the junctor serves as a means of storing existing line conditions and maintaining an up to date source of these line conditions and also serves as a record of operations as they are performed by the common control equipment so as to provide a basis for automatically determining the required sequence of operations to be performed under various conditions. The junctor circuit itself provides the necessary interface between the calling and called line circuits and the common control equipment by selectively associating this common control equipment with an individual calling or called line circuit as is necessary while isolating the remaining equipment or line circuit.

The present invention provides an improvement over the universal junctor circuit disclosed and illustrated in the aforementioned application of James G. Pearce et al. in that it provides a junctor circuit capable of replacing the previously utilized originating and terminating junctors, and which is additionally capable of performing the necessary functions for associating common control equipment and special features equipment with the various line circuits to effect an interconnection between calling and called line circuits without recourse to or necessity to associate the junctor circuit with a programmed memory. The present invention provides all of the advantages of flexibility and control in a single circuit as achieved in the universal junctor circuit described in the aforementioned copending application, without any need for the rather complicated and expensive supervisory processing circuit and associated programmed memory. The many advantages derived from this simplification in equipment will become more apparent from the following detailed description of the invention.

It is a principal object of the present invention to provide an improvement in electronic common control telephone equipment of the type described herein.

It is another object of the present invention to provide a universal junctor circuit capable of effecting under control of a register sender system the necessary control operations for interconnecting calling and called line circuits.

It is another object of the present invention to provide an improvement in electronic common control telephone equipment in the form of a universal junctor circuit providing a common interface between calling and called line circuits and electronic common control equipment.

It is a further object of the present invention to provide improvements in telephone communication equipment through provision of a universal junctor circuit for use in combination with a time division multiplex common control system.

It is still a further object of the present invention to provide a special features trunk circuit in combination with a non-programmed universal junctor circuit for making available special class of service functions.

It is still another object of the present invention to provide a special features trunk circuit for use in an electronic telephone control system to provide add-on conference service.

It is a further object of the present invention to provide a universal junctor circuit and a special features trunk circuit acquired by said junctor circuit in response to a subscriber signal in connection with a class of service request.

It is another object of the present invention to provide a special features trunk circuit with individual answer detection and forced release capabilities.

Figure 2A:
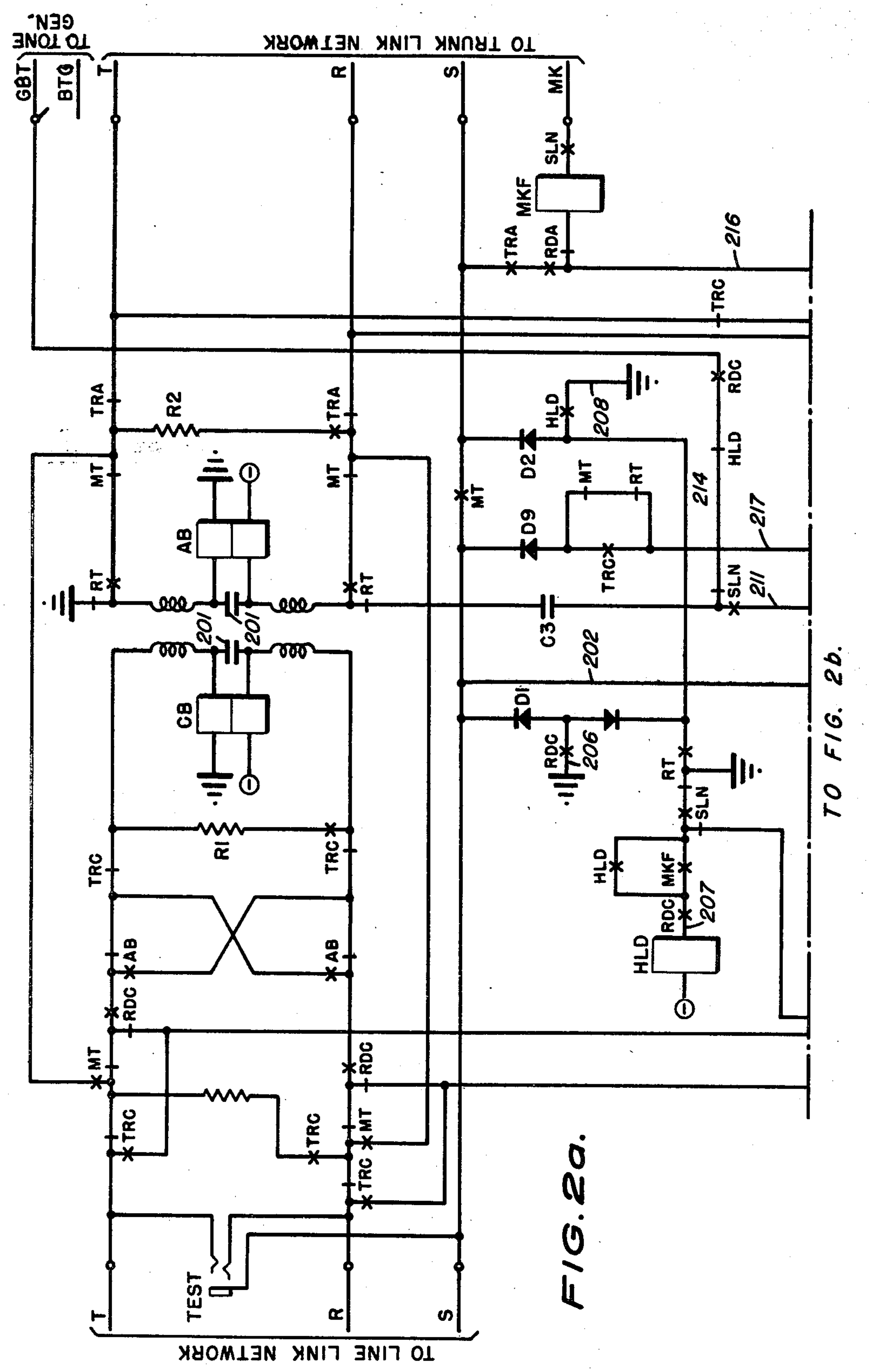
Figure 2B:
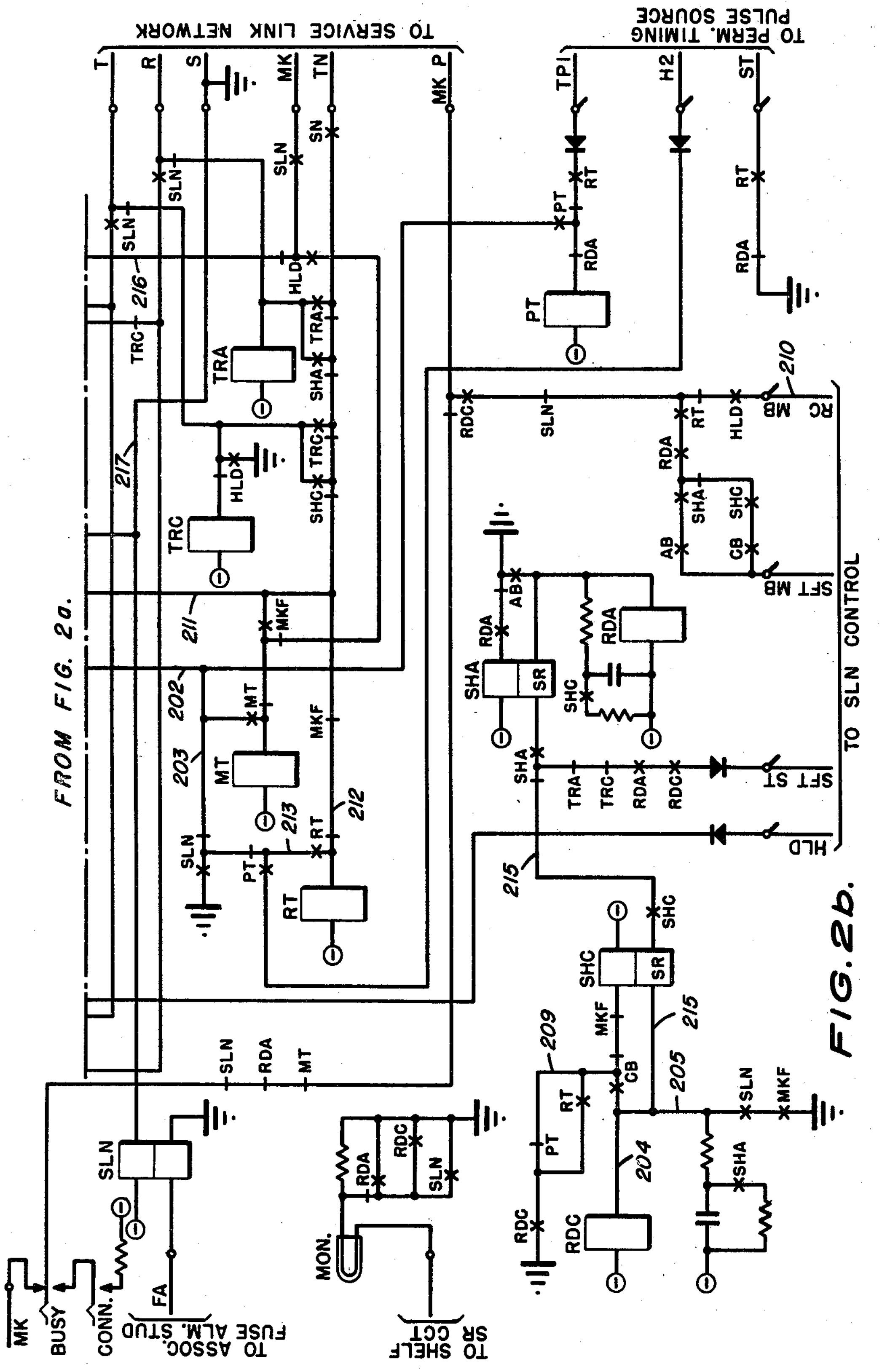
Figure 3A:
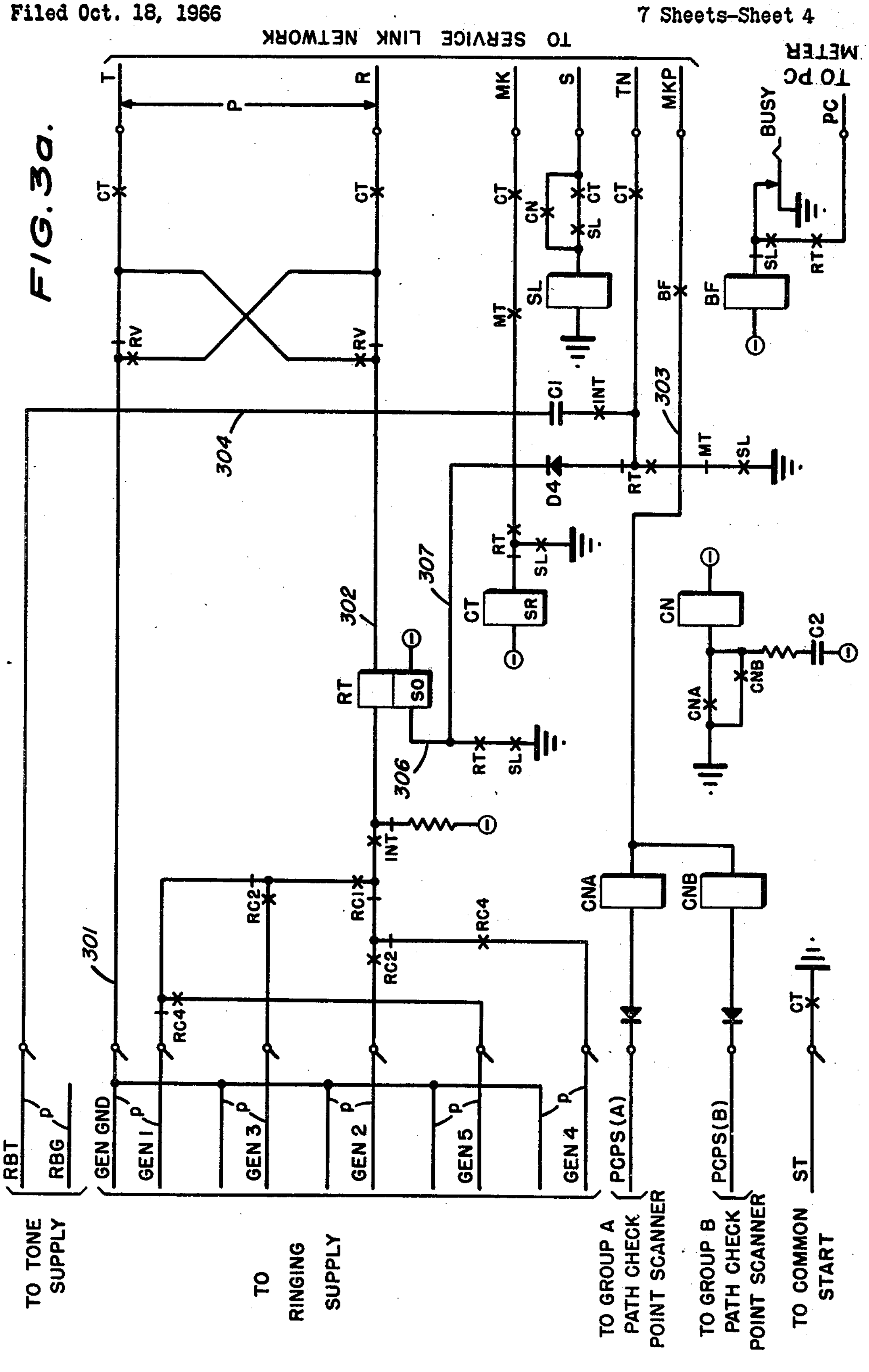
Figures 3B, 3C:
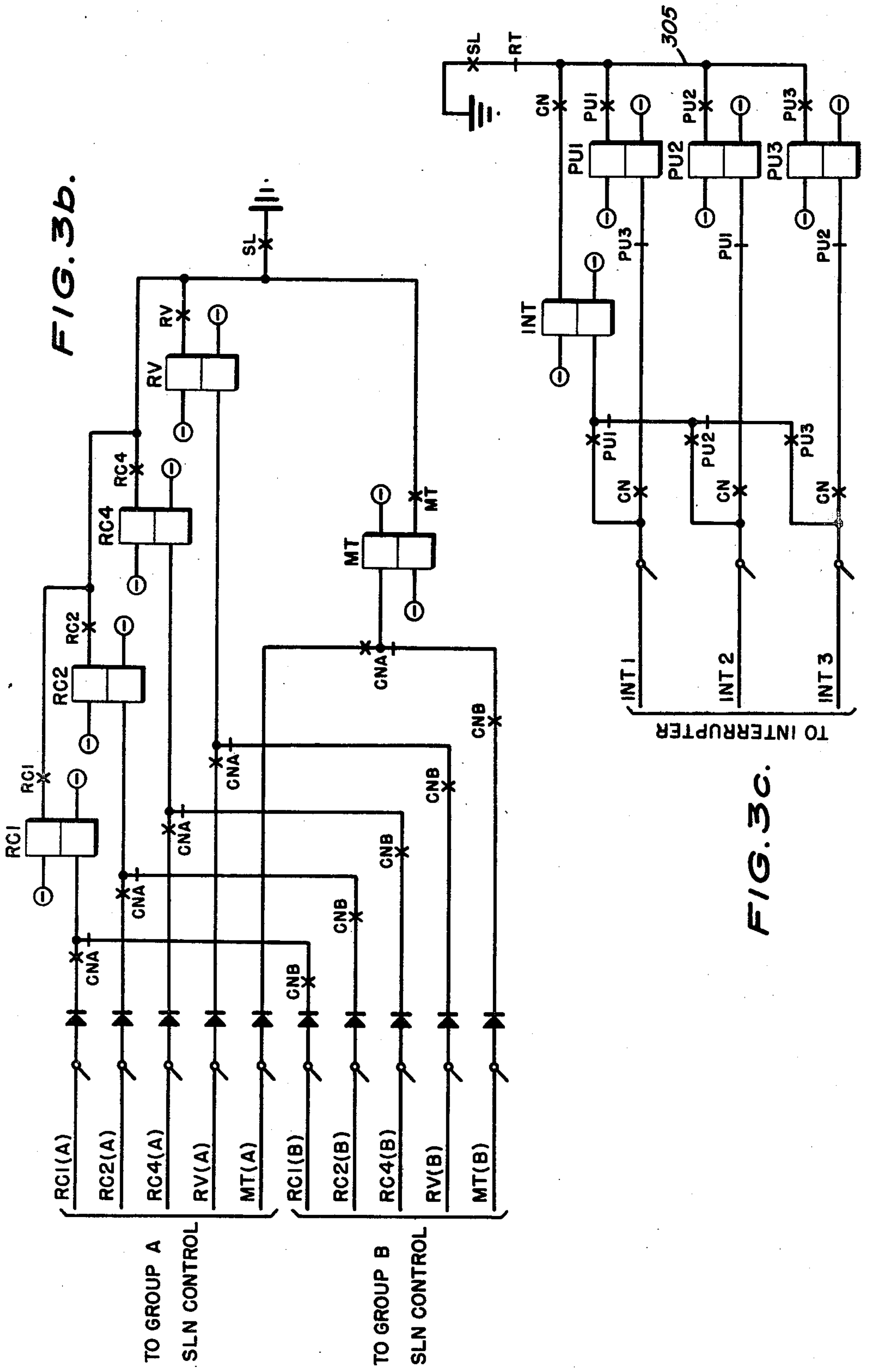
Figure 4A:
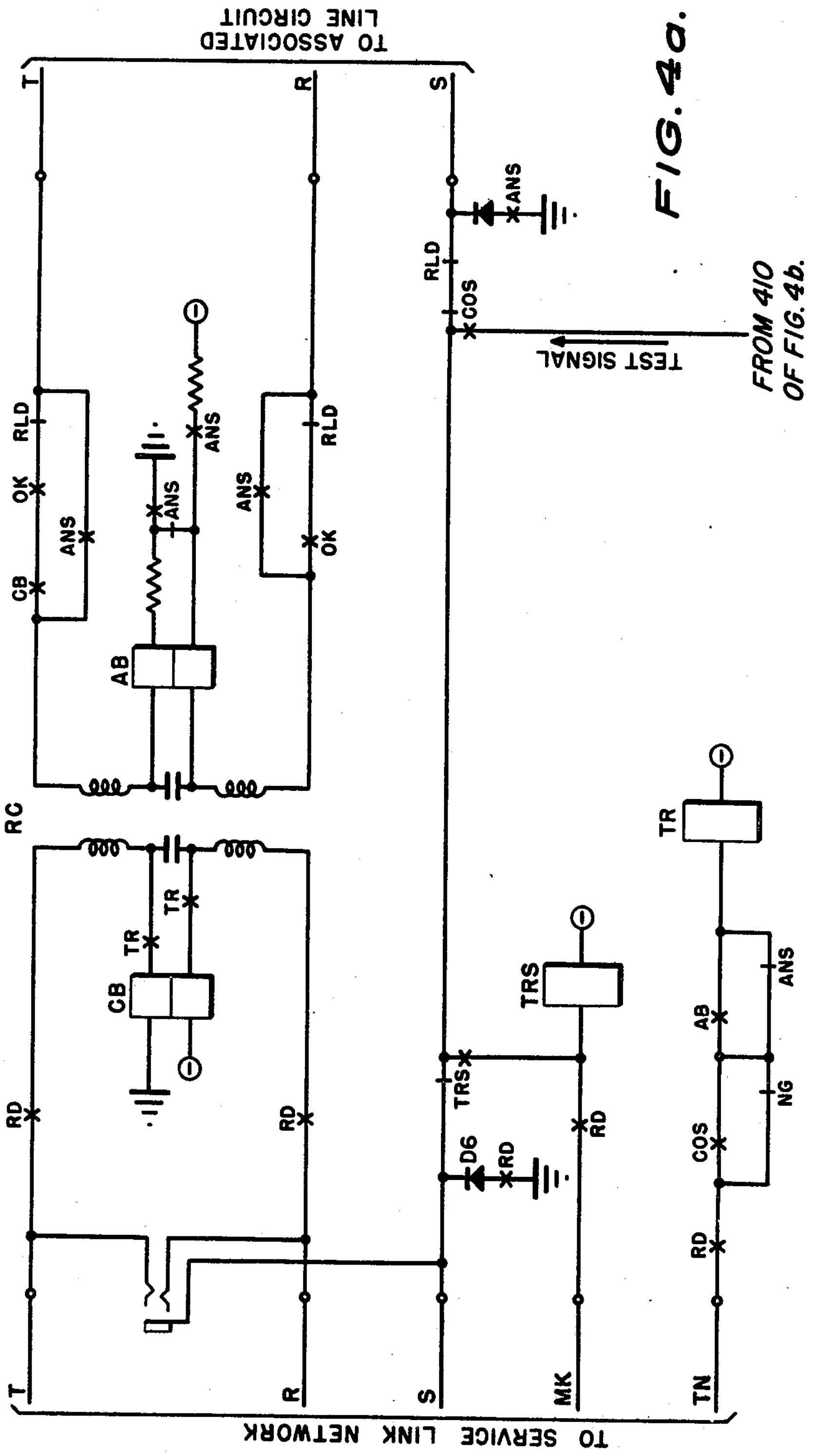
Figure 4B:
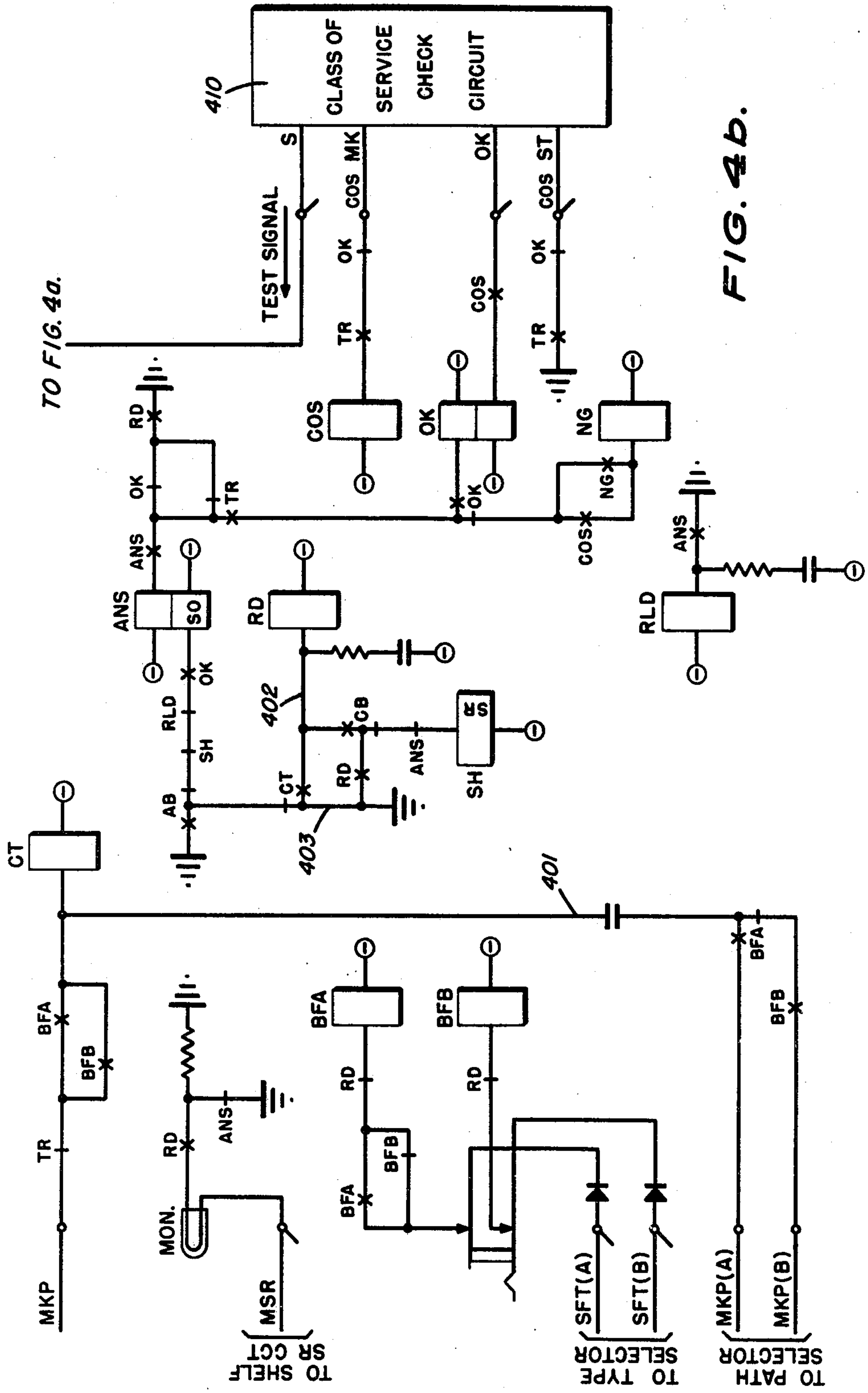

These and other objects, features, and advantages of the present invention will become more apparent from the following detailed description of the invention when taken in conjunction with the accompanying drawings, which illustrate one example of the present invention, and wherein:

FIGURE 1 is a schematic block diagram of an electronic telephone system within which is incorporated the features of the present invention;

FIGURES 2*a* and 2*b* combined represent a schematic circuit diagram of the universal junctor circuit of the present invention;

FIGURES 3*a*, 3*b*, and 3*c* combined represent a schematic circuit diagram of a ring control circuit utilized with the present invention; and FIGURES 4*a* and 4*b* combined represent a schematic circuit diagram of the special features trunk circuit in accordance with the present invention.

OVERALL SYSTEMS OPERATION

Referring now to FIGURE 1 of the drawing which illustrates a basic block diagram of a telephone system including the present invention comprising a plurality of line circuits 101 connected in groups of ten to line link networks 102, of which there are two provided in the illustrated embodiment for purposes of showing how a plurality of lines may be controlled by the present invention. However, it should be understood that additional line link networks may be provided in the overall system through interconnection of the control circuitry in the well-known manner. A line scanner 103 is provided for each line link network 102 and is connected to each line circuit 101 associated therewith. The line scanner 103 is in turn connected to a line link network control 104 which upon receipt of information from the line scanner regarding a closed line circuit condition, locates the closed line and marks it via the line link network 102.

The line link network control 104 is connected to a number translator 105 which is also connected to the line scanner 103 and serves to provide information regarding the directory number of the line which is calling and of the required routing and class of service information in connection with this line circuit. Connected to the number translator 105 is a common register processor 106, which may take the form of a typical register sender system, such as disclosed in copending application S.N. 300,557 of James G. Pearce et al., filed Aug. 7, 1963, now Patent No. 3,312,786 wherein a single all-electronic system is provided for storing information regarding the called and calling subscribers, such as routing digits for the called parties and class of service for the called and calling parties and for making this information available for purposes of processing a call in a fully automatic manner.

In accordance with the present invention, a plurality of universal junctor circuits 107 which connect the line link network 102 through a trunk link network 108 back to the line link network 102 or to outgoing trunk circuits, as required, are associated with the common register processor 106, service link network 111, and service link network control 110 to effect the necessary operations attendant to establishing a transmission path between calling and called line circuits. The service link network 111 operates under control of the common register processor 106 and service link network control 110 to associate common equipment with the calling and called line circuits through the junctor, which common equipment is available on a time share basis. This common equipment may include, for example, a ring control 115, special features trunk 120 and class of service check circuit 410, in addition to other normally provided common equipment (not shown).

The line scanner 103 constantly tests each line circuit 101 to determine whether it requires connection to the register equipment to establish a path to the required number. As soon as it finds such a line, the scanning operation is stopped and the number of the calling line is inserted into the line link network control 104 which results in a marking being applied to identify the appropriate line equipment position which is calling. At this time, the common register processor 106 effects selection of a universal junctor 107 for association with the calling line circuit, and as soon as a junctor has been chosen, the cross points in the selected path from the line circuit through the line link network 102 to the junctor 107 are closed, connecting the line circuit to the junctor.

The calling line circuit is now connected metallically through the junctor and service link network 111 to the common register processor 106 which returns dial tone. As soon as the first dialing impulse is received in the register processor, the dial tone is disconnected and the dialing impulses are built up into the called number.

When sufficient information is obtained to indicate that the first digit has been dialed, reference is made to the number translator 105 from the register processor 106 to determine whether the destination of the call can be established from the information received at that time. If the destination of the call cannot be supplied at that time, then the register refers to the translator again after the second digit has been received and if this is unsuccessful, after the third digit has been received, and so forth. In addition to the destination the number translator will indicate whether the call is a local terminating one or an outgoing one.

When the relevant dialed information has been received, the register signals the line link network control 104 through the number translator 105 for purposes of marking the called line circuit. A ringing control circuit is then associated with the service link network 111 which connects this common equipment to the junctor 107 for purposes of applying the proper ringing and ring back signals through the junctor 107 to the calling and called line circuits. As soon as the called subscriber answers the call, the junctor effects interconnection between the calling and called line circuits and the register processor 106 is disassociated from the transmission circuit.

In the case of a special features request from either subscriber, appropriate controls in the junctor will effect interconnection of the register processor 106 and service link network control 110 through the service link network 111 to the junctor 107 for providing the proper requested class of service. Under control of the register processor 106 the appropriate special equipment is connected through the service link network 111 to the junctor 107 for providing this special feature.

Referring now more specifically to the features of the present invention, as illustrated in FIGURES 2*a* and 2*b*, which when combined form a single junctor circuit in accordance with the present invention, the main transmission lines T and R from the line link network to the trunk link network are connected through a repeat coil RC in the form of a transmission bridge. The sleeve lead S extends through the junctor metallically and the marking lead MK from the line link network serves as a means in conjunction with various relays in the junctor for marking the junctor busy upon connection to the line link network. The marking lead MK from the junctor to the trunk link network provides means in conjunction with other suitable relays in the junctor for marking forward to the trunk link network to hold the switch train therein. The speech path through repeat coil RC includes a primary and a secondary containing the dual winding calling bridge relay CB and a similar dual winding answering bridge relay AB connected to the respective primary and secondary windings of the transformer with the aid of DC isolation capacitors 201. Battery is provided at one of the windings of each of the relays CB and AB so that upon connection of either the primary or secondary of the transmission bridge to a closed loop in the respective calling and answering line circuits, the respective relay will be operated.

The junctor circuit, illustrated in FIGURES 2*a* and 2*b*, contains a plurality of relays which serve to perform the necessary monitoring or sensing functions in addition to the control functions previously provided by the programmed junctor disclosed in the aforementioned application of James G. Pearce et al.

A first relay provided in the junctor is a dual winding SLN relay connected to the control line S from the junctor through the service link network to the calling line circuit by marking the sleeve lead S from the junctor to the line link network with ground so as to effect a setting of the cross points in the line link network to the calling line circuit in the conventional way. This SLN relay also serves to connect control lines T, R, S, MK, TN and MKP from the service link network into the junctor for effecting attachment of the common register processor 106 and various common equipment to the junctor.

A second relay provided in the junctor is the relay MKF which is operated by the common register processor 106 via the service link network and serves to mark forward on the MK lead from the junctor through the trunk link network to the called line circuit.

A third relay in the junctor is the relay RDC which is operated by the relays SLN and MKF and places ground upon the sleeve lead S from the junctor to the line link network to hold the cross points in the line link network after seizing of the junctor and during subsequent operations. This relay RDC also permits operation of the calling bridge relay CB by connecting the bridge to the calling line circuit and disconnecting the service link network from the calling line circuit at the same time.

A fourth relay in the junctor is the relay HLD which is operated by the relay RDC to place ground on the sleeve lead S to the called line circuit through the trunk link network so as to hold the cross points in the trunk link network during subsequent operations.

If it is not already apparent, it will be apparent from the detailed description of the operation of the invention that the relays SLN, MKF, RDC, and HLD perform all of the functions leading up to application of ringing and ring back to the respective line circuits. The remaining relays perform monitoring and various control operations.

A fifth relay in the junctor is the relay RT, commonly known as the ring trip relay. The relay RT not only trips ringing or disconnects the ringing circuit from the transmission bridge RC but also provides a ground on the sleeve lead S from the junctor through the trunk link network to the called line circuit for subsequent operations and simultaneously connects the secondary of the transformer bridge to the closed loop in the called line circuit, thereby operating the answering bridge relay AB which establishes the control necessary to monitoring of the activities subsequent to establishing the call between the calling and called subscribers.

A sixth relay in the junctor circuit is the relay SHC which is responsive to the calling bridge relay CB monitoring the conditions of the calling line circuit and serves to recognize a flashing condition in the calling line circuit initiating control from the service link network control 110 and the common register processor 106 for associating, if available, a special features trunk with the transmission line through the junctor.

A seventh relay TRC is provided in the junctor for operation in conjunction with the relay SHC and serves to transfer the calling line circuit from the speech transmission bridge RC directly to the service link network for purposes of associating a special features bridge with the calling line circuit.

The relays SHA and TRA operate in response to recognition of a flashing condition in the called line circuit by the answering bridge relay AB and perform much in the fashion of the relays SHC and TRC for purposes of establishing a connection from the called line circuit through the service link network to a special features trunk.

Another relay RDA operates to prevent release of the relay SHA in response to a flashing condition in the called line circuit. The relay thus provides a delay in release so that the flashing condition in the called line circuit can be recognized. This function is also provided in conjunction with the calling line relay SHC by the relay RDC.

A final relay in the junctor is the relay MT which serves to bypass the primary and secondary of the transformer bridge RC metallically for purposes of switching the call through the junctor to an outgoing trunk circuit.

The novel features of the present invention derived from the junctor circuit illustrated in FIGURES 2A and 2B can best be appreciated from the detailed description of the operation thereof. As indicated in the general description of the operation of the system in conjunction with FIGURE 1, when a calling line circuit is detected by the line scanner 103 the line link network control 104 marks the calling line circuit and selects a free junctor 107 for association with the call. The junctor is marked "free" by a continuous path from the MK lead of the line link network through the junctor circuit to the mark path lead MKP to the service link network. Any of the known path finding or selector circuits for selecting one of a plurality of available time shared circuits provided in the common register processor 106 may be utilized for purposes of associating a particular junctor with the line link network for connection to the calling line circuit.

For purposes of connecting the junctor circuit selected through the line link network to the calling line circuit, the register processor 106 applies ground via the service link network to the control lead S in the junctor, which is connected directly to one operate winding of the relay SLN and serves to complete the circuit through this relay operating the relay to connect the control lines T, R, MK and TN from the service link network to the junctor. At the same time, the sleeve lead S to the line link network is marked with ground via the leads 202 and 203 through the operated contacts of the relay SLN. The marking on the sleeve lead S serves to effect connection of the junctor by a selected path through the line link network to the calling line circuit. Path selection through the line link network may be effected in the present case by any well-known control circuitry provided for this purpose.

Operation of the relay SLN also opens the normally closed contacts of this relay in the marking lead MK from the line link network to the service link network, thereby marking the junctor busy and preventing further acquisition of this junctor by the register processor 106 until the call has been completed and the junctor is no longer needed for effecting interconnection between the line circuits. With the relay SLN operated, the calling line circuit is connected metallically through the junctor and the service link network directly to the common register processor 106 which returns dial tone to the calling subscriber and awaits recipt of dialed impulses therefrom.

The dialed or keyed digits from the calling subscriber are received by the common register processor which removes dial tone after recipt of the first digit. When dialing has been completed for a local call, the register processor 106 requests the number translator 105 which tests the called line circuit, and if found free, causes it to be marked in the well-known manner, while the mark lead MK from the junctor to the trunk link network is marked by the register processor through the service link network and via the control lead MK in the junctor. This marking of both the junctor and the called line circuit causes a closing of the cross points in the trunk link network along a selected path to complete connection between the junctor and the called line circuit. As soon as this occurs, the completed circuit effects operation of the relay MKF, the mark forward relay, which closes a path from the relay RDC via lines 204 and 205 through the closed contacts of relay SLN and MKF therein to ground, operating the RDC relay.

Operation of the release delay calling relay RDC effects connection of ground via lead 206 and diode D1 to the sleeve lead S extending from the junctor to the line link network and serves to hold the closed cross points in the line link network during subsequent operations regardless of the condition of the SLN relay. This ground applied to the sleeve lead is not extended to the trunk link network due to the normally open contacts of the relay MT which serves to divide the sleeve lead S into a calling side and a called side for all operations except those in which the junctor is by-passed metallically. However, operation of the relay RDC closes the path along line 207 through the relay HLD, closed contacts of relays RDC, MKF and SLN and through the normally closed contact of relay RT to ground, operating the relay HLD. Operation of the HLD relay serves to apply ground through diode D2 to the called side of the sleeve lead S to the trunk link network, thereby holding the closed cross-points in the trunk link network during subsequent operations regardless of the conditions of the relay MKF. The marking on the control lead MK from the common register processor 106 and service link network 111 is then removed opening the circuit to relay MKF, which restores at this time.

With the operation of the relay RDC, the closed loop in the calling line circuit is extended to the primary of the repeat coil RC operating the calling bridge relay CB. Operation of RDC relay also disconnects the control lines T and R from the service link network to the calling line circuit at this time, while operation of the calling bridge relay CB closes a holding circuit for the relay RDC from line 204 to line 209, which includes the normally closed contacts of relay PT and the closed contacts of operated relay RDC itself.

After establishing the connection forward to the called line circuit from the junctor through the trunk link network, the register processor 106 releases the connection from itself to the junctor by removal of ground from the control lead S from the junctor to the service link network. This releases the relay SLN in the junctor disconnecting the control leads T, R, MK and TN in the junctor from the comparable leads in the service link network. The register processor 106 then requests the service link network control 110 to attach ring control 115 through the service link network 111 to the junctor. In effecting this interconnection between the junctor and the ring control circuit, the service link network control applies a potential to the RC MB lead into the junctor at line 210. This potential is applied by the line 210 through the closed contacts of operated relay HLD, normally closed contacts of relay RT, normally closed contacts of relay SLN, and closed contacts of operated relay RDC to the mark path MKP lead to the service link network. The potential on this lead to and through the service link network to the ring control circuit 115 effects an initiation of the ringing control operation.

THE RING CONTROL

Referring now to FIGURES 3A and 3B, which illustrate the ring control circuit to be used in conjunction with the junctor circuit of the present invention, this ring control circuit is operated via control from the service link network control 110 and the common register processor 106 for application of a ringing signal consisting of a selected combination of tones derived from a plurality of available tone generators in accordance with a ringing code stored in the number translator 105 and applied to the ring control circuit via the common register processor 106. While a particular circuit arrangement for the ring control circuit is illustrated and disclosed herein, it should be understood that other ring circuits providing convention techniques for applying a ringing signal and a ring-back tone to the called and calling line circuits, respectively, may be utilized in conjunction with the junctor circuit of the present invention without loss of advantages inherent therein, provided the necessary control described in conjunction with the ring circuit is effected in the manner required by the present invention. Referring now to FIGURE 3A, which discloses the ringing supply portion of the circuit having the necessary controls for initiating operation of the ring control circuit under control of the service link network control and register processor, a plurality of tone generators (not shown) are provided from a ringing supply for connection in various combinations to the leads 301 and 302 to the control lines T and R through the service link network to the junctor circuit. A relay RT, which is a separate and distinct relay from the corresponding relay RT in the junctor circuit, serves as a ring trip relay in the ring control circuit and is connected in the control line 302 therein.

Relays CNA and CNB are provided in line 303 of the ringing circuit which is connected to the mark path MKP through the service link network to the junctor; the relays serving as means for selecting under control of the register processor 106 one or the other of two ringing control groups in the service link network control. One or the other of the group control relays also serve to selectively energize a relay CN which remains operated for a sufficient time only to operate a second relay SL connected to the control lead S through the service link network to the junctor, applying at the same time a ground to this control lead so as to effect an interconnection between the ring control and the junctor through the service link network. The relay SL serves to initiate the various operations performed by the ring control by applying ground to the ring control relays, and interruptor relays, to be described in connection with FIGURES 3B and 3C, and the ring trip relay RT. The SL relay also serves to operate a slow release relay CT which serves to complete the connection between the control output lines in the ring control circuit and the control lines to the junctor via the service link network.

A relay BF serving as a busy-free control for the ring control circuit is normally operated in the free condition of the ring control circuit and is disconnected by the operation of the SL relay indicating that the circuit is associated with a junctor.

Prior to a specific description of the operation of the ring control circuit, reference is made to FIGURES 3B and 3C which disclose, respectively, the control relay arrangement for effecting connection of the proper combination of tone generators to the output lines T and R of the ring control circuit in accordance with the ringing code for the called subscriber as derived from the number translator 105 and the required interruptor circuit for providing timing of the ringing intervals of the ring signal and ring-back tone signal.

Looking particularly to FIGURE 3B, the service link network control 110 provides a group A and a group B control for the relays RC1, RC2, RC4 and RV which reflect the ringing code derived from the common register processor 106. The group A and group B controls are provided on a traffic basis with means being provided in the service link network control for connecting one or the other group of controls to a ring control circuit as the controls are available. These controls provide the ringing code which actuates the relays in the ring control circuit in a particular combination to provide a ringing signal for the called subscriber indicated by the line link network control 104. Thus, actuation of the relays RC1, RC2, and RC4 in various combinations will connect various combinations of the five tone generators from the ringing supply to the lines 301 and 302 connecting the control lines T and R to the junctor. The relay RV in this control group serves to reverse the lines 301 and 302 to double the number of combinations of ringing signals available for use in conjunction with various subscribers.

Looking now to FIGURE 3C, a common interruptor arrangement is provided for use in controlling the application of the ringing signal from the ringing supply to the junctor circuit. The relay INT performs the interruptor operation, having its contacts in the line 302 to the control line R at the output of the ringing control so that operation of the relay is necessary for application of a ringing signal to the junctor circuit. The operation of the relay INT is controlled by the timed operation of one of the relays PU1, PU2 and PU3. In the well-known manner, timing signals are applied to the input lines INT1, 2 and 3 from an interruptor circuit of conventional construction, not shown, so that upon actuation of the ringing control circuit one of the timing signals applied at that instant to the inerruptor will actuate one of the relays PU1, PU2, or PU3 which will then be held in the operated position and determine that interval of the three ringing intervals which will control the application of the ringing tone to the junctor circuit for application to the called line circuit. The interruptor relay INT also provides contacts in a ring-back line 304 connected to a ring-back tone generator and to the output control line TN to the junctor.

The operation of the ring control circuit will now be described. As indicated above, a request for the ring control circuit is effected via the service link network control through application of a potential to line 210 in the junctor and through to the mark path MKP where it is applied through the service link network to the corresponding mark path MKP in the ring control circuit. If the circuit is free, the busy free relay BF will be operated closing the mark path MKP to one of the two relays CNA or CNB as determined by the service link network control. It will be assumed for purposes of this description that the relay CNA is selected by the service link network control for application of the group A control to the ring control relay portion of the circuit.

Operation of the relay CNA applies ground to close the circuit through the relay CN operating this relay during the charging time of the capacitor C2. Operation of the relay CN completes the path from ground through the relay SL to the control line S through the service link network to the junctor circuit, which, as in the case of application of ground to the control line S in the junctor from the register processor 106, operates the relay SLN connecting the lines T, R, MK and TN to the corresponding lines in the ring control circuit via the service link network. Completion of the circuit through the SL relay also operates this relay which immediately operates the relay CT by completing the circuit to ground therethrough. Operation of the CT relay completes the connection of the control lines in the ring control to the corresponding control lines in the junctor circuit and also provides a holding circuit for the relay SL. The lines 301 and 302 from the ringing supply are now connected to the output control lines T and R through the service link network to the junctor.

At the time that the CN relay was operated, operating the relay SL, a path was completed through the interruptor circuit INT to ground and the path from the interruptor circuit through the relays PU1, PU2 and PU3 was also completed so that one of the three relays is operated by the prevailing interruptor interval. Once operated, the pulse interval relay is held by its own closed contacts via line 305 through normally closed contacts RT and the closed contacts of operated relay SL to ground.

Operation of the control relay CT provides a ground mark to an output line to the service link network control indicating a start condition for application of the ringing code to the ring control relay arrangement in FIGURE 3B. Due to operation of the relay CNA, the A group from the service link network control will provide the necessary control signals to the relays RC1, RC2, and RC4 and RV. These relays will be operated in a combination designated by the ringing code for the called subscriber stored in the number translator 105. Operation of the ringing control relays will then connect the generators of the ringing supply in the prescribed combination to the line 301 and 302 under control of the operation of relay INT. At the same time, ring-back tone will be supplied via the line 304 from a ring-back tone generator through capacitor C1 and the closed contacts of periodically operated relay INT and closed contacts of relay CT to the control line TN through the service link network to the junctor circuit. At this point, the service link network control and the common register processor have completed their functions and are released for other calls. The ringing control now has a metallic connection through the cross points of the service link network 111 to the junctor where the ringing signal is applied from the control lines T and R directly to the transmission lines T and R through the trunk link network to the called line circuit and the ring-back tone is applied from the control line TN from the service link network through capacitor C3 in line 211 and the normally closed contacts of ring trip relay RT in the junctor to the secondary of the repeat coil or transmission bridge RC where ring-back tone is induced into the primary of the transformer for application through the line link network to the calling line circuit. This condition maintains until the called party answers or the calling party abandons the call.

When the call is answered, the closed loop condition extending from the called line circuit completes the DC loop necessary to operate the ring trip relay RT in the ringing control circuit which is held closed through the closed contacts of operated relay SL in line 306. Operation of the RT relay in the ring control circuit disables the control relay CT, but only after a delay time because of the slow release qualities of the relay CT. As a result, in spite of operation of the relay RT, both the CT relay and the SL relay will remain operated for a short time period. However, the interruptor circuit will be immediately disabled through removal of ground from the interruptor relay INT upon operation of the RT relay.

As a result of operation of the relay RT prior to release of the relays CT and SL, ground is applied via lead 307 through diode D4 to the control line TN to the junctor circuit. Ground upon the line TN in the junctor circuit serves to complete the circuit via line 212 including the closed contacts of operated relay SLN, and normally open contacts of relays TRA, SHA, TRC, SHC, MKF and RT through the RT relay to negative potential. The relay RT is thus operated in the junctor and locks itself through its own make-before-break spring combination, and line 213 including the contacts of the relay RT, the normally closed contacts of relay PT, and the closed contacts of operated relay SLN to ground. Upon operation of the ring trip relay RT in the junctor, ground is removed from the circuit to the relay HLD, which restores, removing the ground applied via line 208 from the sleeve lead S to the called line circuit; however, ground is simultaneously applied to the sleeve lead S to the called line circuit through the closed contacts of the relay RT via line 214 through diode D2. Thus, the forward switch train to the called line circuit is maintained.

Full release of the ring control circuit is now effected. The delay time of the relay CT having expired, this relay will restore, disabling the relay SL to remove all grounds from the control relays in the ringing control circuit and disconnect the control leads T, R, MK, S, and TN through the service link network to the junctor.

With the operation of the ring trip relay RT, the secondary of the repeat coil RC is connected to the called line circuit through the trunk link network, thereby operating the answering bridge relay AB. Operation of the answering bridge relay AB completes the circuit from ground through the release delay answering relay RDA to operate this relay. The circuit is now in the talking condition with the called and calling subscribers being interconnected through the repeat coil RC. At this time, the relays CB, RDC, RT, AB, and RDA remain operated. Transmission battery to the calling and called lines is supplied through the windings of the relays CB and AB, respectively, and the repeat coil RC. The junctor is now in a condition to recognize a flash from either line circuit or a disconnect therefrom, and awaits such conditions for further operation.

The relays CB and AB connected to the repeat coil RC serve as a means of monitoring hook conditions in both the calling line circuit and the called line circuit, respectively, and provide the necessary control in combination with the relays SHA, SHC, TRA and TRC to detect a flashing condition as opposed to a disconnect. A flash by the calling subscriber will operate the relay SHC via line 209 to ground when the CB relay releases and the re-operation of the CB relay to complete the flashing condition will close ground through the holding winding of the SHC relay via lines 215 to the SFT space lead to the service link network control. This switching of ground from one operate winding to the other of the relay SHC is possible due to the slow release properties of the relay. If there is a special features trunk available, battery will be applied to the lead SFT ST lead from the service link network control holding operation of the relay SHC. Otherwise, the SHC relay will restore after the flash and the operation of the relay will have to begin once again during a subsequent flash from the subscriber. This will continue until a special features trunk is available for connection to the junctor circuit.

If a special features trunk is available, ground on the SFT ST lead will cause the service link network control to return battery on the SFT MB (special features trunk marking battery) lead which, in this case, will be applied through the closed contacts of the relays CB and SHC and the normally closed contact of relay SHA, clo ed contacts of relay RDA and relay RD to the line 210 when the battery voltage will be applied through closed contacts of relay SLN and RDC to the mark path MKP to the service link network. As in the case of connection of the ring control circuit to the junctor, application of potential to the mark path MKP from the junctor to the service link network with corresponding connection of the special features trunk to the service link network by the common register processor and service link network control 110 will effect a closing of the cross points in the service link network to connect the two circuits together.

SPECIAL FEATURES TRUNK CIRCUIT

It is noted that the junctor circuit in accordance with the present invention is capable of associating any of a number of different special features trunk circuits to either the calling or called line circuits for special class of service functions; however, the present invention provides a special features trunk circuit in the form of an add-on-conference circuit for specific use in conjunction with the universal junctor disclosed. This special features trunk circuit is illustrated in FIGURES 4A and 4B.

Referring now to FIGURES 4A and 4B, there is provided a special features trunk circuit providing an add-on-conference class of service to either the calling or the called line on an existing connection therebetween, providing the particular line has the required class of service available to it. Once a connection is established between calling and called subscribers, it is possible for either of these subscribers on that connection to request the special features trunk by a hook switch flash. This will cause the flashing line to be connected through the service link network to one of the special features trunks available. Before the flashing line is transferred, its sleeve lead S is checked for the proper class of service to permit the use of one or more special features provided through this trunk. If the class of service indicates these features are denied the flashing line, the special features trunk along with the service link network are released and the previous connection between the two subscribers on the original connection is re-established. If it is found that the flashing subscriber has the use of the special features trunk available, the other line on the original connection is held and the flashing subscriber's line is extended metallically into the special features trunk which seizes an associated line circuit to cause the connection to be extended to the register processor 106. The flashing subscriber then receives dial tone from the register processor and may dial the desired special feature available to him. The sleeve lead S of the flashing subscriber's line is extended through to the register processor to permit another class of service check if required in line identity for direct distance dialing or abbreviated dialing calls.

The special features trunk circuit in accordance with the present invention provides a plurality of control relays for effecting interconnection between the subscribers associated with the original transmission circuit by way of the junctor and a third party subscriber connected from the junctor through the service link network and the special features trunk.

A first one of these relays is the relay CT which initiates the control sequence in the special features trunk necessary to effect association of this trunk circuit with the service link network and the junctor circuit.

A second relay in the trunk circuit is the relay RD which serves to connect the junctor to the switch train in the service link network and applies ground to the sleeve lead S to the junctor to hold the switch train in the line link network and operate the SLN relay in the junctor to connect the junctor to the service link network.

A third relay in the trunk circuit is the relay TR which serves to connect the calling bridge relay CB to the transmission lines T and R extending to the junctor circuit through the service link network and connects the class of service relay COS to the class of service check circuit 410 for initiating a check of the class of service of the flashing subscriber.

A fourth relay in the trunk circuit is the relay TRS which connects the sleeve lead S from the flashing line circuit in the case of called subscriber flashing through the junctor to the control lead MK extending through the service link network to the special features trunk, where it is connected to the sleeve lead S extending toward the third party line circuit.

A fifth relay in the trunk circuit is the relay ANS which serves to extend the ground on the sleeve lead S from the special features trunk to the third party line circuit to hold the forward switch train and transfers the answering bridge relay AB from a dry loop condition to battery feed.

A sixth relay in the trunk circuit is the RLD relay which operates in conjunction with the relay ANS for monitoring the answering operation from the third party line circuit.

A seventh relay in the trunk circuit is the relay SH which is operated by the relay RD and prevents operation of the relay ANS until the calling bridge relay CB is operated.

The trunk circuit also provides relays OK and NG associated with the class of service check circuit 410 and enabled by the class of service relay COS for indicating, respectively, that the flashing party has the proper class of service or does not have the proper class of service.

The principles of the present invention as related to the special features trunk circuit illustrated in FIGURE 4 can be best understood from a detailed description of the operation thereof in connection with the junctor circuit of FIGURES 2A and 2B.

Referring now to FIGURE 4B, the trunk is marked free by application of a ground to one of the lines SFT by a selector circuit in the service link network control which completes a circuit through the winding of the BFA or BFB relay coil to negative potential. Thus, the trunk can be seized by either of the two controls in the selector portion of the service link network control through proper application of ground to the input of the special features trunk. This connects the path selector, not shown, associated with the service link network to the mark path MKP lead for purposes of determining a free path from the junctor through the service link network to the special features trunk. When the path is selected and closed through the service link network to the flashing junctor, ground on the mark path MKP lead operates the CT relay in the special features trunk which closes the circuit via lines 402 and 403 from ground through the relay RD. Operation of the relay RD connects the transmission lines T and R from the transmission bridge RC in the special features trunk to the service link network and places ground through diode D6 to the sleeve lead through the service link network to the junctor to hold the switch train in the line link network and operate the SLN relay in the junctor, thereby connecting the control lines in the junctor to the service link network. The junctor is then connected through the service link network to the special features trunk.

Operation of the relay RD also operates the relay TR via the TN line connected through the service link network to the junctor and the normally closed contacts of relays NG and ANS. The complete circuit not only operates the relay TR but also places ground on the TN lead in the junctor, operating either the relay TRA or the relay TRC in the junctor via the closed contacts of operated relays SHA or SHC, depending upon whether the flashing condition is derived from the calling line circuit or the called line circuit. Assuming for purposes of this description that the flashing condition is derived from the called line circuit, the relay TRA in the junctor will be operated by ground on the TN lead therein. This ground is prevented from operating the ring trip relay RT in the junctor due to the open contact of the relay SHA in the line 212 to this relay. Operation of the relay TRC will release the relay SHC in the case of a flashing condition from the calling line circuit and will transfer the calling line T and R leads from the repeat coil RC in the junctor to the control leads T and R through the service link network to the special features trunk. In the same manner, operation of the relay TRA will release the already operated relay SHA in the case of a flashing from the called line circuit and will transfer the transmission lines T and R from the called line circuit to the control leads T and R through the service link network to the special features trunk. In the first case, operation of the TRC relay in the junctor will hold the CB relay operated through connection of resistor R1 across the bridge, and in the second case, operation of the TRA relay will hold the AB relay operated through connection of the resistor R2 across the secondary of the bridge.

As indicated above, assuming that the flashing condition is derived from the called line circuit through the junctor, the sleeve lead S from the called line circuit is extended through the junctor via line 216 containing the closed contacts of operated relays TRA and RDA and normally closed contact of relay HLD to the control lead MK extending to the special features trunk. This will result in operation of the relay TRS in the special features trunk, which operation effects connection of the MK lead from the junctor directly to the sleeve lead S in the special features trunk extending toward the third party line circuit connected thereto. At the same time, this sleeve lead S to the third party line circuit is disconnected from the control lead S extending toward the junctor. It is noted at this point that the relay TRS is utilized only when the flashing condition is derived from the called line circuit. If the flashing condition is derived from the calling line circuit, connection of the sleeve lead S from this line circuit is effected via line 217 through diode D9 and the closed contacts of operated relay TRC to the control line S to the special features trunk. In this way, interconnection of the sleeve lead of the flashing party with the third party line circuit is effected for purposes of checking the class of service of both the flashing party and the third party subscriber.

The class of service check is made by a separate class of service check circuit 410, which is conventionally provided in the form of a register or memory device capable of storing class of service information. The special class of service circuit 410 is associated with the special features trunk through operation of the relay COS upon operation of the relay TR. The test for class of service is accomplished through application of a positive direct current pulse or an AC signal superimposed on the S lead connected from the special features trunk to the special class of service circuit 410, which test signal is applied both to the flashing line circuit and to the third party line circuit. If the correct class of service is detected, the relay OK connected to the circuit 410 is operated. Otherwise, after a prescribed delay built into the relay NG, this relay will operate to reject the call. Operation of the relay NG opens the ground connected to the TN lead through the relay TR releasing the TR relay when the COS relay is released by the circuit 410.

If the relay OK operates, connection is completed from the loop through the windings of AB to the associated line circuit which causes the connection to be extended to the register processor associated with the line circuit as on normal calls. The sleeve lead S from the flashing line circuit is also extended through the special features trunk to the register processor to permit further class of service identification to be made therein and line identification if the call is direct distance dialing or abbreviated dialing.

In absence of operation of the ANS relay, which is a slow operate relay which will not be immediately operated by operation of the relay OK, a dry loop condition exists on the secondary side of the repeat coil RC in the special features trunk with battery being supplied from the third party line circuit. Operation of the relay AB upon connection of the repeat coil RC to the third party line circuit further prevents the relay ANS from operating; and the register processor returns dial tone through the special features trunk and service link network to the junctor where it is applied back to the flashing line circuit and the system then awaits dialing by the flashing subscriber.

Dialed impulses are received through the junctor and service link network and pass through the repeat coil RC in the special features trunk where they are applied to the register processor for effecting connection to the third party line circuit. The line circuit which is associated with the special features trunk is assigned special class of service so as to cause the ring control circuit associated with the universal junctor connected thereto to switch the junctor through metallically on answer. In this way, the control functions necessary to complete the call to the third party subscriber line circuit are effected under control of the original universal junctor and the special features trunk circuit.

When the dialing or keying is complete, and the third party line circuit is rung and has been answered, that line is switched through metalically to the special features trunk opening the battery feed to the relay AB which releases this relay and operates the relay ANS. The ANS relay locks itself, transfers the relay AB winding from dry loop to battery feed for the third party; and opens the circuit to the relay TR and closes the circuit to the relay RLD. The release of the relay TR opens the CB relay which restores, and the relay AB reoperates over the line loop and recloses the circuit to the relay RD before it can release. A three-way connection is now established between the two original parties and the third party subscriber through the special features trunk circuit since answer by the third party subscriber causes the special features trunk to remove the ground from the TN lead upon release of the TR relay which restores the previously held originating party to the connection.

Any one of the three parties to the connection may disconnect, leaving the other two in communiction. If one of the two original parties on an established three-way connection flashes his hook switch, he will cause the re-operation of the relay TR (and the relay TRS in the case of a called party flash) in the special features trunk. The operation of the relay TR once again operates the relay COS through connection of the relay to the class of service check circuit 410 initiating a check of the class of service to insure that the flashing party is capable of obtaining the service requested. If an indication of class of service is obtained, the relay OK is operated opening the relay ANS which in turn opens the third party loop and removes ground from the forward sleeve S to release that connection. If the flashing party lacks the proper class of service, the relay NG will be operated instead of the relay OK, releasing the relay TR and restoring the condition to that existing before the flashing condition.

After release of the third party subscriber as described above, upon operation of the relay OK and release of the relay ANS, relay RLD restores and relay TR re-establishes connection to the relay CB and the dry loop is once again re-established across the transmission lines T and R to the associated third party line circuit. The connection is thus extended to the register processor much in the manner as originally existed prior to answer by the third party line circuit. Dialing or keying an assigned code will then cause the register to release this circuit by metallic cut-through of the junctor ahead as if the call were answered. This opens the relay AB operating the relay ANS and the relay RLD as in the case of an answered call; however, the relay AB does not re-operate with the result that with release of the relays TR, OK, and CB the circuit will open to the relay RD, allowing it to release and will open the ground from the front and back sleeve leads S to restore the circuit to normal.

There is thus provided in accordance with the present invention means for forcing a third party subscriber from a conference connection by either of the originating subscribers. Release from a busy, unanswered or incompletely dialed connection may also be accomplished by the dialing party flashing his switch hook long enough to release the forward connection by release of the relay AB and operation of the relays ANS and RLD.

The present invention providing a universal junctor circuit and a special features trunk for use in association therewith has many inherent advantages over similar known arrangements, as apparent from the above description. For example, the universal junctor of the present invention provides for flash detection for either calling or called subscribers with transfer of the flashing subscriber to special features or similar trunk circuits upon detection of the flash in an automatic manner. There is also provided automatic release of the special features circuit to its condition prior to the flashing by a subscriber if no suitable trunk circuit is available upon detection of the flash. The junctor also provides for release of the special features circuit to its condition prior to the flashing condition if a class of service check indicates that the flashing party is not entitled to the special feature requested by the flashing condition.

The special features trunk provides for class of service check after access to the trunk with drop back if service is denied, instead of requiring each junctor or a similar connecting circuit to be equipped with checking equipment for storing equipment for the class of service of each line connected to it. The special features trunk also provides for answer detection by switching the outgoing transmission lines T and R from battery feed to a dry loop in a succeeding circuit. In addition to these features, the invention provides for automatic release of the forward switch train by flash from the dialing party in the case of an incompleted or busy call; and forced release of a third party subscriber connected to the circuit through the forward switch train by initiation of a flashing condition by one of the two parties of the original connection having the proper class of service.

While I have shown and described a single embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. In a telephone communication system including a line link network, a service link network, a trunk link network, a plurality of common equipment circuits, a register processor, and a plurality of originating and terminating line circuits and outgoing trunk circuits, a universal junctor system interposed between said line link network and said trunk link network for interconnecting said originating and terminating line circuits through said line link network and said trunk link network under control of said register processor applied via said service link network and said common equipment circuits, comprising a main voice transmission path including a transformer having primary and secondary windings forming originating and terminating direct current loop circuits therein, calling bridge relay means connected to the primary winding of said transformer and operative upon completion of said originating direct current loop for detecting the open and closed states thereof, answering bridge relay means connected to the secondary winding of said transformer and operative upon completion of said terminating direct current loop for detecting the open and closed states thereof, marking means responsive to said register processor for effecting selective interconnection between said main transmission path and an originating line circuit and between said transmission path and a terminating line circuit or an outgoing trunk circuit, and control relay means for selectively connecting said originating and terminating line circuits individually via said transmission path to said service link network and for selectively isolating said originating and terminating line circuits from each other, from said transformer, and from said service link network in response to said register processor.

2. The combination defined in claim 1 wherein said control relay means includes first relay means responsive to control from said register processor applied via said service link network for connecting said originating line circuit via said transmission path through said service link network to said register processor, said register processor being capable of applying dial tone to said line circuit and receiving and processing dialed instruction therefrom.

3. The combination defined in claim 2 wherein said first relay means is effective to maintain the connection between said transmission path and said originating line circuit independent of the state of said marking means.

4. The combination defined in claim 3 wherein said marking means includes second relay means responsive to control from said register processor upon receipt of dialed instruction from said originating line circuit including the identity of a terminating line circuit for effecting connection of said transmission path to said trunk link network and said terminating line circuit.

5. The combination defined in claim 4 wherein said control relay means further includes third relay means responsive to operation of both of said first and second relay means for disconnecting said originating line circuit from said service link network and for connecting this line circuit to the primary winding of said transformer thereby completing said originating direct current loop and operating said calling bridge relay means.

6. The combination defined in claim 5 wherein said third relay means is effective to maintain connection between said transmission path and said originating line circuit independent of the state of said marking means or said first relay means.

7. The combination defined in claim 6 wherein said control relay means further includes fourth relay means responsive to operation of said third relay means to maintain connection between said transmission path and said terminating line circuit independent of the state of said second relay means.

8. The combination defined in claim 7 wherein said marking means further includes a mark path extending from said register processor through said service link network and said junctor system to said line link network, said mark path including at least normally closed contacts of said first relay means, which open said mark path upon operation thereof.

9. The combination defined in claim 7 wherein said common equipment circuits include ring control means for providing a ringing signal and a ringback signal at appropriate ringing intervals, said first relay means being effective to connect said ring control means to said terminating line circuit via said transmission path for application of ringing signals thereto.

10. The combination defined in claim 9 wherein said control relay means further includes fifth relay means for disconnecting said secondary winding of said transformer from said transmission path to said terminating line circuit during connection of said ring control means thereto while connecting said ringback signal from said ring control means to said secondary winding for application to said originating line circuit.

11. The combination defined in claim 10 wherein said fifth relay means is operated in response to detection of an off-hook condition in said terminating line circuit by said ring control means for connecting said terminating line circuit to said transformer via said transmission path thereby completing said terminating direct current loop and operating said answering bridge relay.

12. The combination defined in claim 11 wherein said fifth relay means disables said fourth relay means and maintains the connection between said transmission path and said terminating line circuit.

13. The combination defined in claim 12 wherein said control relay means further includes sixth relay means for metallically by-passing said transformer in said transmission path in response to control from said register processor.

14. The combination defined in claim 12 wherein said control relay means further includes seventh relay means operated in response to release of said second relay means and said calling bridge relay means during operation of said third relay means for detecting a flashing condition in said originating line circuit, said seventh relay means being locked in the operated state by reoperation of said calling bridge relay means upon termination of said flashing condition in response to receipt of a control signal from said register processor, said seventh relay means being released upon failure to receive said control signal.

15. The combination defined in claim 14 wherein said common equipment circuits include a special features trunk for performing a special class of service, said special features trunk being connected to said junctor system via said service link network by said register processor in response to locking of said seventh relay in the operated state.

16. The combination defined in claim 15 wherein said control relay means includes eighth relay means responsive to connection of said special features trunk to said junctor system for releasing said seventh relay means and for connecting said originating line circuit via said transmission path through said service link network to said special features trunk, said eighth relay means further serving to disconnect said transmission path to said originating line circuit from said transformer.

17. The combination as defined in claim 12 wherein said control relay means further includes ninth relay means operated in response to said answering bridge relay means for monitoring conditions in said terminating line circuit, and means for effecting slow release of said ninth relay means.

18. The combination defined in claim 17 wherein said control relay means further includes tenth relay means operated in response to release of said answering bridge relay means subsequent to operation of said ninth relay means for detecting a flashing condition in said terminating line circuit, said tenth relay means being locked in the operated state by reoperation of said answering bridge relay means upon termination of said flashing condition in response to receipt of a control signal from said register processor, said tenth relay being released upon failure to receive said control signal.

19. The combination defined in claim 18 wherein said common equipment circuits include a special features trunk for performing a special class of service, said special features trunk being connected to said junctor system by said register processor via said service link network in response to locking of said tenth relay in the operated state.

20. The combination defined in claim 19 wherein said control relay means further includes eleventh relay means responsive to connection of said special features trunk to said junctor system for releasing said tenth relay means and for connecting said terminating line circuit via said transmission path through said service link network to said special features trunk, said eleventh relay means further serving to disconnect said transmission path to said terminating line circuit from said transformer.

21. The combination defined in claim 16 wherein said special features trunk comprises an additional transmission path including an additional transformer having primary and secondary windings forming originating and terminating direct current loop circuits therein, and twelfth relay means responsive to said register processor for connecting said additional transmission path to said service link network for connection to the transmission path in said junctor to the originating line circuit.

22. The combination defined in claim 21 wherein said twelfth relay means serves to hold the connection through said service link network to said junctor system and is effective to actuate said first relay means in said junctor system to connect the service link network and the transmission path in said junctor system.

23. The combination defined in claim 21 wherein said special features trunk further includes thirteenth relay means actuated in response to said twelfth relay means, and additional calling bridge relay means connected to said primary winding responsive to said thirteenth relay means for completing said originating current loop in said additional transmission path.

24. The combination defined in claim 23 wherein said common equipment circuits further include check means for determining the class of service available to a subscriber circuit and said special features trunk further includes fourteenth relay means for connecting said special features trunk to said check means to check the class of service of said originating line circuit via said junctor system and service link network.

25. The combination defined in claim 24 wherein said special features trunk further includes fifteenth relay means responsive to said check means for providing a positive class of service indication for said originating line circuit and sixteenth relay means responsive to said check means for providing a negative class of service indication for said originating line circuit.

26. The combination defined in claim 25 wherein said special features trunk further includes additional answering bridge relay means connected to the secondary winding of said additional transformer for completing a dry loop in said additional transmission path to a third party line circuit, said additional answering bridge relay means being responsive to said fifteenth relay means and said additional calling bridge relay means to connect said secondary winding to said transmission path.

27. The combination defined in claim 26 wherein said special features trunk further includes seventeenth relay means responsive to operation of said additional answering bridge relay means for connecting battery to said secondary winding of said additional transformer to complete the terminating direct current loop associated therewith.

28. The combination defined in claim 20 wherein said special features trunk comprises an additional transmission path including an additional transformer having primary and secondary windings forming originating and terminating direct current loop circuits thereby and twelfth relay means responsive to said register processor for connecting said original transmission path to said service link network for connection to the transmission path in said junctor system to the terminating line circuit.

29. The combination defined in claim 28 wherein said twelfth relay means serves to hold the connection through said service link network to said junctor system and is effective to actuate said first relay means in said junctor system to connect the service link network and the transmission path in said junctor system.

30. The combination defined in claim 29 wherein said special features trunk further includes thirteenth relay means responsive to said twelfth relay means for connecting the primary winding of said additional transformer to said additional transmission path, and additional calling bridge relay means connected to said primary winding responsive to said thirteenth relay means for completing said originating current loop in said additional transmission path.

31. The combination defined in claim 30 wherein said special features trunk further includes eighteenth relay means for connecting the terminating line circuit via said junctor system and said service link network to said special features trunk, said eighteenth relay means being responsive to operation of said twelfth relay means.

32. The combination defined in claim 31 wherein said common equipment circuits further include check means for determining the class of service available to a subscriber circuit and said special features trunk further includes fourteenth relay means for connecting said special features trunk to said check means to check the class of service of said terminating line circuit via said junctor system and service link network.

33. The combination defined in claim 32 wherein said special features trunk further includes fifteenth relay means responsive to said check means for providing a positive class of service indication for said terminating line circuit and sixteenth relay means responsive to said check means for providing a negative class of service indication for said terminating line circuit.

34. The combination defined in claim 33 wherein said special features trunk further includes additional answering bridge relay means connected to the secondary winding of said additional transformer for completing a dry loop in said additional transmission path to a third party line circuit, said additional answering bridge relay means being responsive to said fifteenth relay means and said additional calling bridge relay means to connect said secondary winding to said transmission path.

35. A special features trunk circuit for use with a telephone communication system including a line link network, a service link network, a trunk link network, a plurality of common equipment circuits, a register processor, a plurality of originating and terminating line circuits, and a junctor system for interconnecting an originating and a terminating line circuit through said line link network and said trunk link network under control of said register processor applied via said service link network, said trunk circuit comprising a transmission path including a transformer having a primary and a secondary winding forming originating and terminating direct current loop circuits therein, and control relay means for connecting said transmission path via said service link network and said junctor system to an established communication connection between originating and terminating line circuits and also to a third party line circuit under control of said register processor and said junctor system.

36. The combination defined in claim 35 wherein said control relay means includes second relay means responsive to said register processor for connecting said transmission path to said service link network.

37. The combination defined in claim 35 wherein said junctor system includes first relay means for connecting said junctor system to said service link network, said first relay means being responsive to operation of said second relay means.

38. The combination defined in claim 37 wherein said control relay means further includes third relay means responsive to said second relay means for connecting the primary winding of said transformer to said transmission path to said service link network, and calling bridge relay means connected to said primary winding responsive to said third relay means for completing said originating current loop.

39. The combination defined in claim 38 further including check means for determining the class of service available to a subscriber circuit, said control relay means further including fourth relay means for connecting said special features trunk to said check means to check the class of service of a line circuit connected to said junctor system.

40. The combination defined in claim 39 wherein said control relay means further includes fifth relay means responsive to said check means for providing a positive class of service indication for said line circuit connected to said junctor system and sixth relay means responsive to said check means for providing a negative class of service indication for said line circuit.

41. The combination defined in claim 40 further including answering bridge relay means connected to the secondary winding of said transformer for completing a dry loop in said transmission path to said third party line circuit, said answering bridge relay means being responsive to said fifth relay means and said calling bridge relay means to connect said secondary winding to said transmission path.

42. The combination defined in claim 41 wherein said control relay means further includes seventh relay means responsive to the operation of said answering bridge relay means for connecting battery to said secondary winding of said transformer to complete the terminating direct current loop associated therewith.

References Cited

UNITED STATES PATENTS

| | | |
|---|---|---|
| 3,391,252 | 7/1968 | Germanton. |
| 3,133,994 | 5/1964 | Zarouni. |

KATHLEEN H. CLAFFY, Primary Examiner

THOMAS W. BROWN, Assistant Examiner

U.S. Cl. X.R.

179—18.1